Dec. 28, 1971   A. G. SMITH   3,630,870

BASE CONCENTRATION CONTROL IN ELECTRODEPOSITION OF PAINT

Filed Dec. 12, 1969

ARTHUR G. SMITH
INVENTOR.

BY John R. Faulkner
Olin B. Johnson

ATTORNEYS

United States Patent Office 3,630,870
Patented Dec. 28, 1971

3,630,870
BASE CONCENTRATION CONTROL IN
ELECTRODEPOSITION OF PAINT
Arthur G. Smith, Livonia, Mich., assignor to Ford
Motor Company, Dearborn, Mich.
Filed Dec. 12, 1969, Ser. No. 884,390
Int. Cl. B01k 5/02
U.S. Cl. 204—181
1 Claim

ABSTRACT OF THE DISCLOSURE

The concentration of water-soluble base in an electrocoating bath from which polycarboxylic acid resin is anodically deposited is controlled by circulating the coating bath in contact with a continuously agitated ion exchange monobed consisting essentially of a major amount of weakly acidic cation exchange resin and a minor amount of weakly basic anion exchange resin.

BACKGROUND OF THE INVENTION

Figure 1:
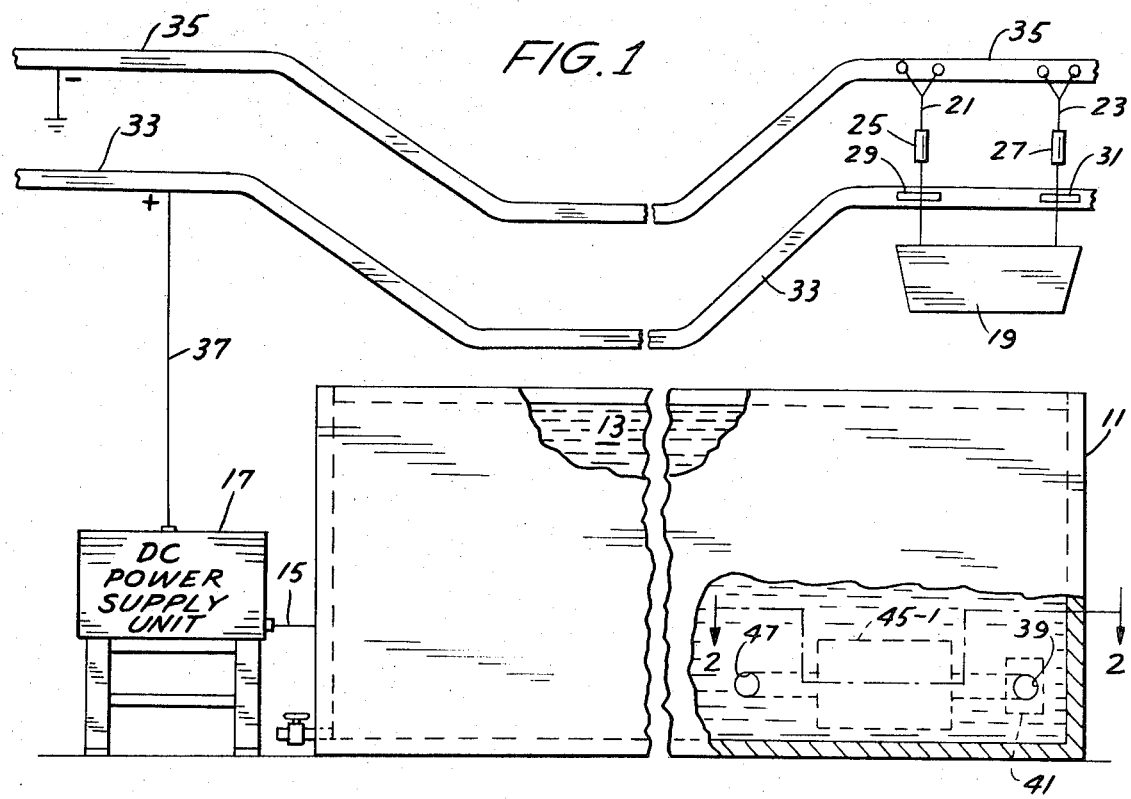

Electrodeposition of paint from an aqueous dispersion thereof onto an electrode-workpiece immersed in such dispersion is a method for painting which has now gained widespread industrial acceptance. The effective employment of this method requires the use of especially prepared paints. By far the most common embodiment of this process is one of anodic deposition, i.e., the object to be coated is the relatively positive electrode or anode of an electrodeposition cell and the relatively negative electrode or cathode is spaced apart from the anode and is in contact with the bath in which the anode is immersed. The cathode may be the tank retaining the coating bath or the interior of the tank may be nonconductive with one or more cathodes positioned inside the tank.

In anodic deposition of paint, as practiced in industrial painting operations, a substantial portion, preferably a major proportion, of the paint binder resin is a synthetic polycarboxylic acid resin having free or unreacted carboxylic groups in its molecular structure prior to dispersion which are contributed by a constituent acidic monomer. These resins are at least partially neutralized in an aqueous bath with a water-soluble base which serves as resin dispersal assistant or solubilizer. The water-soluble base is preferably a water-soluble amine. Other water-soluble bases are known to be operable for this purpose. These include potassium hydroxide, lithium hydroxide, sodium hydroxide, etc. The acidic resin is thereby dispersed in the aqueous base solution as anionic polyelectrolyte and upon impression of unidirectional or direct electric current is electrodeposited upon the anode of the electrodeposition cell.

Suitable acidic binder resins for anodic deposition include, but not by way of limitation, coupled oils such as sunflower, safflower, perilla, hempseed, walnut seed, dehydrated castor oil, rapeseed, tomato seed, menhaden, corn, tung, soya, oiticica, or the like, the olefinic double bonds in the oil being conjugated or nonconjugated or a mixture, the coupling agent being an acyclic olefinic acid or anhydride, preferably maleic anhydride, but also crotonic acid, citraconic acid, or anhydride, fumaric acid, or an acyclic olefinic aldehyde or ester of an acyclic olefinic ester such as acrolein, vinyl acetate, methyl maleate, etc., or even a polybasic acid such as phthalic or succinic, patricularly coupled glyceride oils that are further reacted with about 2 to about 25% of a polymerizable vinyl monomer; maleinized unsaturated fatty acids; maleinized rosin acids, alkyd resins, e.g., the esterification products of a polyol with polybasic acid, particularly glyceride drying oil-extended alkyd resins; acidic hydrocarbon drying oil polymers such as those made from maleinized copolymers of btuadiene and diisobutylene; diphenolic acid and like polymer resins; and acrylic vinyl polymers and copolymers having carboxylic acid groups such as butyl acrylate-methyl methacrylate-methacrylic acid copolymers, acrylic acid and lower alkyl ($C_1$ to $C_4$) substituted acrylic acid-containing polymers, i.e., those having carboxyl groups contributed by alpha-beta unsaturated carboxylic acids or residues of these acids, etc. Coating materials suitable for use in this method of painting are disclosed in U.S. Pats. 3,230,162; 3,297,557; and 3,369,983 and elsewhere in the literature. In industrial application a difference of electrical potential in the range of about 100 to about 1000 volts is maintained between anode and cathode during deposition and the temperature of the bath is maintained between about 15° and about 50° C. The concentration of binder resin in the bath is in the range of about ½ to about 35, preferably about 5 to about 15, weight percent of the bath.

The acidic paint binder resin should be at least partially neutralized by the base, but this coating operation is continued and a plurality of objects are painted and removed from the bath, the components of the bath are depleted at different rates. The binder resin with attendant pigments, fillers, etc., are removed at much faster rates than is the water-soluble base.

With some of the amine solubilized resin systems, the desired balance can be maintained by replenishing the bath with a high solids feed which contains less amine than is needed for dispersing the resin. In this method of replenishment, excess amine in the bath serves to assist in the dispersion of the amine starved replenishment feed. This method is not always feasible due to the absence of effective mixing equipment, characteristics of the acid resin-solubilizer system etc.

If replenishment is effected with base satisfied replenishment feed or a replenishment feed containing water-soluble base in excess of that lost from the bath in the painting operation, an imbalance soon occurs with resultant excess base concentration in the bath. The pH of the bath rises with this build-up, operational difficulties ensue and product quality deteriorates until the product is no longer acceptable. Removal of such excess base and maintenance of an acceptable base concentration are thus required. Optimum pH will vary somewhat with different acid resin systems but is ordinarily above 6 and below 10, more commonly in the range of about 6.7 to about 9. As is known in the art, several methods have been advanced for removing such excess base. These include dialysis, electrodialysis and adsorption or synthetic cation exchange resins.

THE INVENTION

The concentration of water-soluble base in a continuous process for anodically depositing paint is effectively controlled by a novel ion exchange method. In this method, a portion of the aqueous coating bath comprising water, polycarboxylic acid resin and water soluble base is passed through a stirred monobed reactor which contains in intimate admixture a major component of a weakly acidic cation exhange resin and a minor amount of a weakly basic anion exchange resin. Surprisingly, the presence of the anion exchange resin dramatically improves the efficiency of the cation exchange resin if the mixed bed is continuously agitated.

Suitable ion exchange resins for use in this method are well known in the art and are commercially available. Weakly acidic cation exchange resins which can be used herein are described in U.S. Pats. 2,783,212; 2,885,371 and elsewhere in the literature. Weakly basic anion exchange resins which can be used herein are described in U.S. Pats. 2,597,493; 2,732,352; 3,047,516 and 3,423,336 and elsewhere in the literature. The suitable cation exchange resins employed contain ionizable carboxyl groups in their molecular structure. The corresponding functional groups of the suitable anion exchange resins are primary and/or secondary and/or tertiary amine groups.

The two ion exchange resins are combined in a manner to establish a combined operational pH for the bed. When the base concentration in the bath exceeds the established pH of the resin bed the excess base is gradually removed from the bath by the cation exchange resin in the bed. The desired operational pH of the bed is established by adjustment of the relative concentrations of the active functional groups of the respective resins within the mixed bed.

The mixed ion exchange resin bed is continuously agitated to maintain a constant mix of the resin particles and more particularly effective mixing of the functional groups thereon.

With accumulation of base removal, the cation exchange resin is gradually deactivated. The resin mix is removed for reactivation when the pH of the bath rises above a predetermined level. Reactivation can be effected by means well known to the art after separation of the cation exchange resin from the anion exchange resin. For example, the cation exchange resin can be reactivated by washing it with aqueous hydrochloric acid and the anion exchange resin can be reactivated by washing it with aqeuous sodium hydroxide.

The presence of the anion exchange resin provides an additional bonus in that it removes from the bath undesirable anions which enter the bath as contaminants, e.g., chloride ions, sulfate ions, chromate ions, etc.

In view of the predominant use of water-soluble amines as the resin dispersing agent the detailed description of this invention will be directed primarily to the use of such base.

DETAILED DESCRIPTION OF A PREFERRED EMBODIMENT

Figure 2:
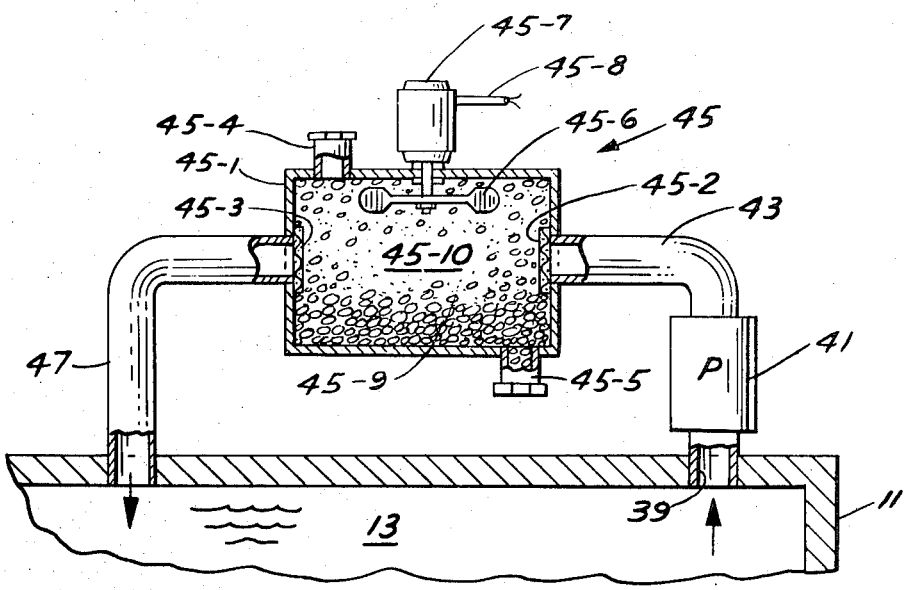

Referring now to the accompanying drawings wherein:

FIG. 1 is a semidigrammatic view of one embodiment of apparatus suitable for use in the method of this invention; and FIG. 2 is a view taken along line 2—2 of FIG. 1.

In the drawing a steel tank 11 contains a coating bath 13 and serves as a negative electrode in the coating process. Tank 11 is electrically connected to D.C. power supply unit 17 via conductor 15. An article to be coated 19, e.g., an automobile body, is shown suspended from a conveyor 35 by hangers 21 and 23. Conveyor 35 is a conventional electrically powered, chain driven conveyor constructed and arranged for the transportation of articles to be coated through bath 13.

Hangers 21 and 23 include insulators 25 and 27, respectively, which insulate article 19 from the grounded conveyor. Contact plates or brushes 29 and 31 are attached to and in electrical connection with hangers 21 and 23, respectively. Article 19 is shown approaching bath 13 and in electrical connection with D.C. power supply unit 17 via conductor 37. Article 19, therefore serves as the positive electrode of an electrodeposition cell while the article is passing through bath 13.

Power supply unit 17 is constructed and arranged to provide between the electrodes and through the coating bath a direct current flow of electrical energy that is commensurate with the size of the electrocoating operation contemplated. Design of the power supply unit should take into consideration the surface area of the workpieces that will be in residence within the coating bath at any given time, the workpiece surface area entering the bath per unit time, the deposition properties of the coating bath, the thickness of the coating to be formed, etc. Ordinarily, such current will be provided by rectification of an alternating current by means well known to the art.

In fluid communication with coating bath 13 in tank 11 is bath outlet conduit 39, pump 41, conduit 43, monobed reactor unit 45, and bath inlet conduit 47. Monobed reactor unit 45 comprises reactor housing 45–1, filter screens 45–2 and 45–3, resin inlet means 45–4, resin outlet means 45–5, impeller 45–6, and electric motor 45–7 which drives impeller 45–6. Electric motor 45–7 is in electrical connection with an A-C. power source via conductor 45–8. Reactor housing 45–1 forms reaction chamber 45–9 which contains a particulate resin bed 45–10 comprising a mixture of a major amount of cation exchange resin and a minor amount of anion exchange resin. Filter screens 45–2 and 45–3 have a mesh sufficiently large to admit of free flow of all components of the paint dispersion of the bath therethrough and sufficiently small to retain the ion exchange resin particles within chamber 45–9. A portion of bath 13 is continuously or intermittently continuously pumped through conduit 39 by pump 41 and forced by such pump through conduit 43, screen 45–2, chamber 45–9, screen 45–3 and conduit 47 through which it is returned to tank 11. Impeller 45–6 is caused to rotate continuously by electric motor 45–7 and provides continuous stirring of particulate resin bed 45–1. While shown outside the coating tank in this embodiment, it will be understood by those skilled in the art that monobed reactor unit 45 and attendant plumbing can be positioned inside the coating bath.

This invention will be more fully understood from the following illustrative examples.

EXAMPLE 1

A resin bed is prepared comprising 2 parts by weight cation exchange resin and 1 part by weight anion exchange resin. The cation exchange resin used is a commercially available, weakly acidic, carboxylic-polymethacrylic type cation exchange resin, i.e., Rohm & Haas Co.—Amberlite IRC 50 AR, in bead form having average particle size in the range of 0.35 to 0.50 millimeter. The anion exchange resin used is a commercially available, weakly basic, polyamine-styrene type anion exchange resin, i.e., Rohm & Haas Co.—Amberlite IR—45 AR, also in bead form having average particle size in the range of 0.33 to 0.50 millimeter. The cation exchange resin used is 25% neutralized with morpholine. The anion exchange resin used is 25% neutralized with acetic acid. These resins are then wetted with water and it is determined that their stabilized or operational pH is 6.85 within the water phase.

Continuous stirring of 45 grams of this monobed with a 500 millimeter aqueous solution containing 4 milliequivalents morpholine neutralized to pH 8.0 with acetic acid reduces the pH of the solution to 7.2 in 5 minutes and to 7.0 after one hour.

This monobed is then separated from the morpholine containing solution and a year old sample of electrocoating paint is passed continuously therethrough. The paint used is an aqueous dispersion of a polycarboxylic acid resin, pigment and morpholine. The pH of the paint drops from 7.1 to 6.85 in 32 minutes. Mild steel panels are employed as the anodes of an electrodeposition cell and paint from this dispersion and from an untreated sample of the same paint dispersion is electrodeposited thereon at an impressed potential of 100 volts for 30 seconds. All other coating conditions are identical for the treated and untreated samples. The following significant results are obtained.

TABLE 1

|  | Untreated paint | Treated paint |
| --- | --- | --- |
| Area coated, inches | 2 x 2 x ⅛ | 2 x 2 x ⅛ |
| Initial current, amperes | 2.20 | 1.73 |
| Final current, amperes | 0.52 | 0.40 |
| Coulombs, expended | 32 | 26 |
| Baked film appearance | (¹) | (²) |

¹ Very rough-craters.
² Relatively smooth.

EXAMPLE 2

Another stirred monobed reactor is prepared from 30 grams wet cation exchange resin of Example 1 (150 milliequivalents), 40 milliequivalents morpholine, 15 grams wet anion exchange resin (30 milliequivalents), 6 milliequivalents acetic acid and 700 milliliters water. This mixture has a pH of 7.0 after standing for 5 days. The monobed resin is separated and used to treat 5 successive 500 milliliter portions of paint formulation. Each portion is stirred in contact with the monobed for 30 minutes. This corresponds to a treating rate of 0.37 milliliter paint/gram bed/minute. This paint is an automobile body primer paint and comprises an aqueous dispersion of polycarboxylic acid resin, pigment and diethylamine amine. The paint dispersion at the beginning of treatment has a pH of 7.1 and contains 9.0% paint solids. The pigment component comprises 19.6% of the solids. Treated and untreated portions are used as electrocoating baths and the paint is anodically deposited upon 2" x 3" bonderized steel panels at an impressed potential of 100 volts for 30 seconds and the results of these operations are set forth in the following table.

| Paint | Initial pH of paint | Final pH of paint | Initial current, amperes | Final current, amperes | Expended coulombs | Film thickness, mils | Percent nitrogen in Cured film |
|---|---|---|---|---|---|---|---|
| Untreated, blank 1 | 7.1 | 7.10 | 1.32 | 0.10 | 17.2 | 0.75 | 0.23, 0.20 |
| Untreated, blank 2 | 7.1 | 8.10 | 1.37 | 0.10 | 18.0 | 0.75 | |
| Portion 1, panel 1 | 7.1 | 6.70 | 1.18 | 0.12 | 16.8 | 0.75 | |
| Portion 1, panel 2 | 7.1 | 6.70 | 1.14 | 0.12 | 16.8 | 0.90 | |
| Portion 2, panel 1 | 7.1 | 6.70 | 1.14 | 0.12 | 17.6 | 0.90 | |
| Portion 2, panel 2 | 7.1 | 6.70 | 1.28 | 0.12 | 17.0 | 0.90 | |
| Portion 3, panel 1 | 7.1 | 6.70 | 1.23 | 0.12 | 18.0 | 0.80 | 0.15, 0.15 |
| Portion 3, panel 2 | 7.1 | 6.70 | 1.23 | 0.12 | 17.9 | 0.85 | |
| Portion 4, panel 1 | 7.1 | 6.80 | 1.20 | 0.12 | 18.0 | 0.70 | |
| Portion 4, panel 2 | 7.1 | 6.80 | 1.17 | 0.12 | 17.0 | 0.75 | |
| Portion 5, panel 1 | 7.1 | 6.80 | 1.26 | 0.10 | 18.0 | 0.85 | |
| Portion 5, panel 2 | 7.1 | 6.80 | 1.16 | 0.12 | 18.5 | 0.85 | |

After treating 2.5 liters of paint, the monobed is rinsed free of pigment and paint. Taking advantage of the density difference in the two resins, a separation is made by repeated mixing in water and decanting. It is estimated that the separation is more than 90% complete. The cation exchange resin concentrate is regenerated with dilute hydrochloric acid and the anion exchange resin concentrate is regenerated with a dilute sodium hydroxide solution. These regeneration effluents are found to have the following analysis:

| Cation exchange resin effluent, mg. | | Anion exchange resin effluent, mg. | |
|---|---|---|---|
| Zinc | 3.6 | Chromate | 10.8 |
| Iron | 0.84 | Sulfate | 8.64 |
| Calcium | 0.46 | Chloride | Trace |
| Magnesium | Trace | | |
| Strontium | Trace | | |

It is calculated that the concentration of the cations removed from the paint is $0.72 \times 10^{-4}$ eq./liter and of the anions was $1.5 \times 10^{-4}$ eq./liter.

EXAMPLE 3

A test was made to determine the effect, if any, continuous agitation of the mixed resin monobed is discontinued. A thoroughly mixed resin bed is prepared consisting of 30 weight percent of the cation exchange resin of Example 1 and 70 weight percent of the anion exchange resin of Example 1. A dilute morpholene acetate solution of pH 8.0 is poured through the stationary bed and the effluent tested. It is found that this bed loses its ability to control pH when only about 3.3% of the theoretical functional capacity of the bed is exhausted.

A second test is made in the same manner except that this time the resin distribution is 70 weight percent cation exchange resin and 30 weight percent anion exchange resin and only slightly better bed efficiency is achieved.

EXAMPLE 4

The procedure of Example 2 is repeated except that the amine removed is diethanol amine.

EXAMPLE 5

The procedure of Example 2 is repeated except that the amine removed is triethylamine.

EXAMPLE 6

The procedure of Example 2 is repeated except that the cation exchange resin employed is prepared in the following manner: 500 cc. of water and 10 grams of medium viscosity polyvinyl alcohol are poured into a 4-neck flask of three liters capacity, fitted with a thermometer, mechanical stirrer, refluxing condenser and nitrogen inlet tube. As soon as the polyvinyl alcohol is dissolved while stirring a mixture consisting of 300 grams of acrylonitrile, 30 grams of methyl acrylate, 50 grams of commercial 50% divinylbenzene and 10 grams of benzoyl peroxide is added to the content of the flask. The dispersion is adjusted to pH 5 and is then heated for three hours to 60° C. while a stream of nitrogen is passed through the flask. After cooling, the solid copolymer pearls are separated from the liquid by decanting and filtering. They are then air-dried.

1000 cc. of 80% $H_2SO_4$ are poured into a beaker of two liters capacity, fitted with a mechanical stirrer and a thermometer, and placed in ice cold water. While stirring, the temperature of the acid is reduced to 5° C., then 150 grams of copolymer pearls, prepared as described above, are added. The mixture is kept at 5° C., while stirring, for two hours, during which time the copolymer pearls swell. Then the whole is diluted abundantly with ice water, the pearls are separated from the liquid and are then washed with water until free of the acid. The pearls thus swelled and washed are introduced into a 3-neck flask of one-liter capacity, fitted with a thermometer, mechanical stirrer and refluxing condenser, together with 500 cc. of a 30% NaOH solution and 50 cc. of ethyl alcohol. The whole is heated to 80° C., while stirring for three hours, and is then diluted with water. The pearls are separated and washed while being stirred with 1000 cc. of 10% HCl and finally with water until complete removal of the acid.

The anion exchange resin used in combination therewith is prepared in the following manner: a proliferous copolymer of 90% vinylanisole and 10% butadiene is chloromethylated as follows: 23.3 parts (equivalent to 0.15 mole of polymerized vinylanisole) of the copolymer is soaked in 370 parts of ethylene dichloride for one hour during which time the polymer swells markedly. To the mixture contained in a 3-necked flask equipped with stirrer, thermometer, and reflux condenser is added 36 parts (0.45 mole) of chloromethyl ether, $CH_2ClOCH_3$, and this mixture is stirred at room temperature for one and one-half hours. Then 60 parts (0.45 mole) of anhydrous aluminum chloride is added slowly while the mixture is maintained at a temperature of 20°–30° C. by means of external cooling. The mixture is stirred and maintained at room temperature overnight. Thereafter 600 parts of water is added and the resultant mixture is stirred for one hour. The resin is filtered off and is thoroughly washed with water, after which it is dried in an oven overnight at 65° C. Analysis shows that the product contains 8.1% chlorine (corresponding to a product in which 81% of the aromatic nuclei are chloromethylated). Inspection reveals that this chloromethylated material is still in the form of a popcorn or proliferous polymer. This product is aminated as follows: in a 3-necked flask equipped with stirrer, thermometer, and reflux condenser are mixed eight parts of the dry product and 70 parts of toluene. The mixture is heated at 80° C. for an hour during which the polymer swells after which it is cooled to room temperature. Then 19.3 parts of diethylenetriamine are added and the mixture is heated to refluxing temperature and held there for five hours. The reaction mixture, cooled to room temperature, is next filtered and the resinous product is washed thoroughly with water and is then stripped of toluene and amine by steam-distillation. The final product is separated and dried. When tested with a solution of hydrochloric acid, it is found to have a capacity of 2.6 milliequivalents for each gram of dry resin.

EXAMPLE 7

The monobed treatment and comparative testing carried out in Examples 1 and 2 is repeated with a paint comprising an aqueous dispersion of polycarboxylic acid resin binder, pigment and potassium hydroxide as the water soluble base. The paint samples treated and the control have excess base. The comparative results are quite similar to those obtained in Examples 1 and 2.

EXAMPLE 8

The monobed treatment and comparative testing carried out in Examples 1 and 2 is repeated with a paint comprising an aqueous dispersion of polycarboxylic acid resin binder, pigment and lithium hydroxide as the water soluble base. The paint samples treated and the control have excess base. The comparative results are quite similar to those obtained in Examples 1 and 2.

It will be understood by those skilled in the art that modifications can be made within the scope of the invention as hereinbefore described and hereinafter claimed.

What is claimed is:

1. In a method for electrodepositing paint upon electrically conductive objects successively immersed in an electrodeposition cell comprising a coating bath, a cathode in contact with said bath and the object being painted serving as the anode of said cell during painting, wherein said bath comprises an aqueous dispersion of acidic paint binder resin at least partially neutralized with water-soluble base, a direct electric current is passed through said bath between said cathode and said anode causing said paint binder resin to electro-deposit an electrically resistant film of said paint binder resin upon said anode, the resultant painted anode is removed from said bath, a series of said objects are successively painted in said bath by said method causing the paint binder resin in said bath to be depleted at a rate in excess of the rate at which said water-soluble base is depleted, and said bath is replenished with acidic paint binder resin at least partially neutralized with water-soluble base at a rate such that water-soluble base is introduced into such bath at a greater rate than the same is depleted in the painting operation, the improvement which comprises maintaining the concentration of water-soluble base in said coating bath below a predetermined level by continuously passing a portion of said coating bath through a continuously agitated particulate mixture of a major proportion of weakly acidic cation exchange resin the functional groups of which are carboxyl groups and a minor proportion of weakly basic anion exchange resin the functional groups of which are amine groups, and returning said portion to said coating bath.

References Cited

UNITED STATES PATENTS

| | | | |
|---|---|---|---|
| 2,800,447 | 7/1957 | Graham | 204—181 |
| 3,499,828 | 3/1970 | De Vittorio | 204—181 |

HOWARD S. WILLIAMS, Primary Examiner